(12) United States Patent
Patel

(10) Patent No.: US 7,240,750 B2
(45) Date of Patent: Jul. 10, 2007

(54) METHOD FOR IMPROVING FUEL ECONOMY IN HYBRID VEHICLES

(75) Inventor: Vipul M. Patel, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/187,494

(22) Filed: Jul. 22, 2005

(65) Prior Publication Data

US 2007/0017719 A1   Jan. 25, 2007

(51) Int. Cl.
*B60K 1/00* (2006.01)
(52) U.S. Cl. .................... 180/65.2; 180/65.3
(58) Field of Classification Search ............. 180/65.1, 180/65.2, 65.3, 65.4; 235/61 J; 73/114; 318/139, 430; 702/60, 64; 701/35, 1, 123
See application file for complete search history.

(56) References Cited

U.S. PATENT DOCUMENTS

| | | | |
|---|---|---|---|
| 4,247,757 A * | 1/1981 | Crump, Jr. ................. 235/61 J |
| 4,258,421 A * | 3/1981 | Juhasz et al. ................. 701/35 |
| 4,400,779 A * | 8/1983 | Kosuge et al. ............... 701/123 |
| 4,564,905 A * | 1/1986 | Masuda et al. ................. 701/1 |
| 5,148,702 A * | 9/1992 | Gulick, Jr. .................... 73/114 |
| 5,173,856 A * | 12/1992 | Purnell et al. ................. 701/35 |
| 6,092,021 A * | 7/2000 | Ehlbeck et al. ............. 701/123 |
| 6,242,873 B1 * | 6/2001 | Drozdz et al. .............. 318/139 |
| 6,338,391 B1 * | 1/2002 | Severinsky et al. ........ 180/65.2 |
| 6,366,848 B1 * | 4/2002 | Gustavsson ................. 701/123 |
| 6,975,217 B2 * | 12/2005 | Endoh ........................ 701/123 |
| 7,024,306 B2 * | 4/2006 | Minami et al. ............. 701/123 |
| 2003/0065560 A1* | 4/2003 | Brown et al. ................. 702/60 |

* cited by examiner

*Primary Examiner*—Hau Phan
(74) *Attorney, Agent, or Firm*—Dan L. Thompson

(57) ABSTRACT

The present invention provides a method for improving fuel economy in hybrid vehicles. More precisely, the method of the present invention includes a selectable "learn mode" in which the vehicle can learn a particular driving schedule. After a particular driving schedule is learned, the schedule can be recalled to optimize fuel economy on future trips following the same route. By recalling a learned schedule, the system knows in advance what energy level will be needed and can proactively charge the hybrid vehicle's battery to an appropriate level.

14 Claims, 2 Drawing Sheets

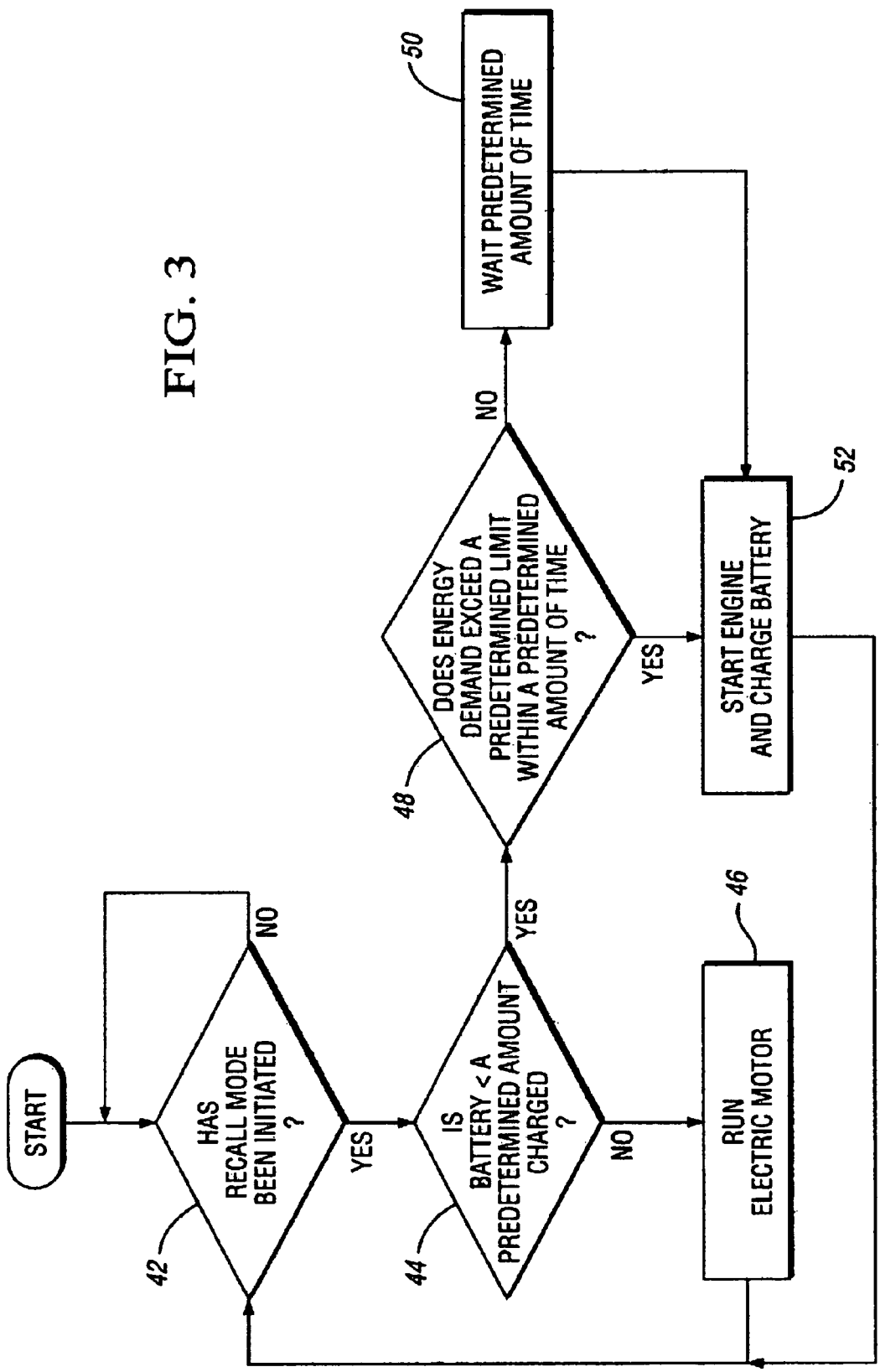

METHOD FOR IMPROVING FUEL ECONOMY IN HYBRID VEHICLES

TECHNICAL FIELD

The present invention relates to a method for improving fuel economy in hybrid vehicles.

BACKGROUND OF THE INVENTION

Hybrid vehicles typically include an engine, a battery and an electric motor/generator. The electric motor/generator is generally operated to power a conventional hybrid vehicle until the battery is discharged by a predetermined amount (e.g., 85% discharged). Thereafter, the engine is operated to power the hybrid vehicle and charge the battery. When the battery is sufficiently charged, the engine is stopped and the electric motor/generator is operated to power the hybrid vehicle in a fuel efficient manner.

SUMMARY OF THE INVENTION

The present invention provides a method for improving fuel economy in hybrid vehicles. More precisely, the method of the present invention includes a selectable "learn mode" in which the vehicle can learn a particular driving schedule. After a particular driving schedule is learned, the schedule can be recalled to optimize fuel economy on future trips following the same route. By recalling a learned schedule, the system knows in advance what energy level will be needed and can proactively charge the hybrid vehicle's battery to an appropriate level.

A method of the present invention provides improved fuel efficiency of a hybrid vehicle in the following manner. A control module records energy demand data of the hybrid vehicle during a first trip along a particular driving schedule. Thereafter, the control module recalls the energy demand data prior to a subsequent trip along the same driving schedule. The control module then evaluates the energy demand data to anticipate periods of increased energy demand that require operation of the engine. The control module can then coordinate charging the hybrid vehicle's battery with the periods of increased energy demand to minimize implementation of the engine such that the fuel efficiency of the hybrid vehicle is improved.

In one aspect of the present invention, the control module waits to record energy demand data until a signal initiating the learn mode is received.

In another aspect of the present invention, the control module records the energy demand data at a temporary memory location.

In yet another aspect of the present invention, the control module saves the recorded energy demand data at a non-volatile memory location.

In still another aspect of the present invention, the control module waits to recall energy demand data until a signal initiating the recall mode is received.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a flow chart illustrating a method for implementing saved energy data to improve the fuel efficiency of the hybrid vehicle of FIG. 1.

DESCRIPTION OF THE PREFERRED EMBODIMENTS

Figure 1:
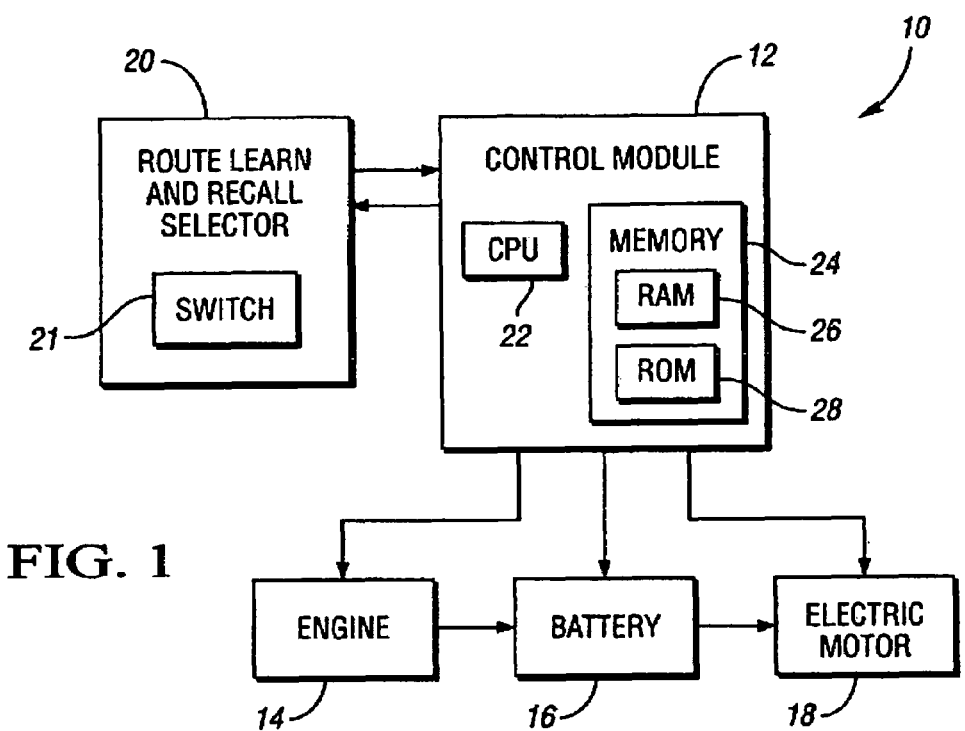
FIG. 1 is a schematic illustration of hybrid vehicle according to the present invention.

Referring to FIG. 1, a schematic depiction of a hybrid vehicle 10 according to the present invention is shown. The hybrid vehicle 10 includes a control module 12 adapted to control an engine 14, a battery 16 and an electric motor/generator 18. The engine is adapted to charge the battery 16, and the battery 16 is adapted to power the electric motor/generator 18. The electric motor/generator 18 may also charge the battery 16. The hybrid vehicle 10 further includes a route learn and recall selector 20.

The control module 12 preferably includes a microprocessor or CPU 22 and a memory device 24. The memory device preferably includes RAM 26 and ROM 28.

The route learn and recall selector 20 is adapted to initiate learn and recall modes. Accordingly, the selector 20 preferably includes a switch 21 disposed within the passenger compartment of the vehicle 10, however, the selector 20 may alternatively include other devices adapted to initiate learn and recall modes such as, for example, a driver information center. The "learn mode" is a mode of operation wherein the control module 12 records energy demand characteristics of the hybrid vehicle 10 during a particular route. The "recall mode" is a mode of operation wherein the control module 12 recalls previously recorded energy demand characteristics of the hybrid vehicle 10 during a particular route in order to optimize fuel efficiency as will be described in detail hereinafter.

Figure 2:
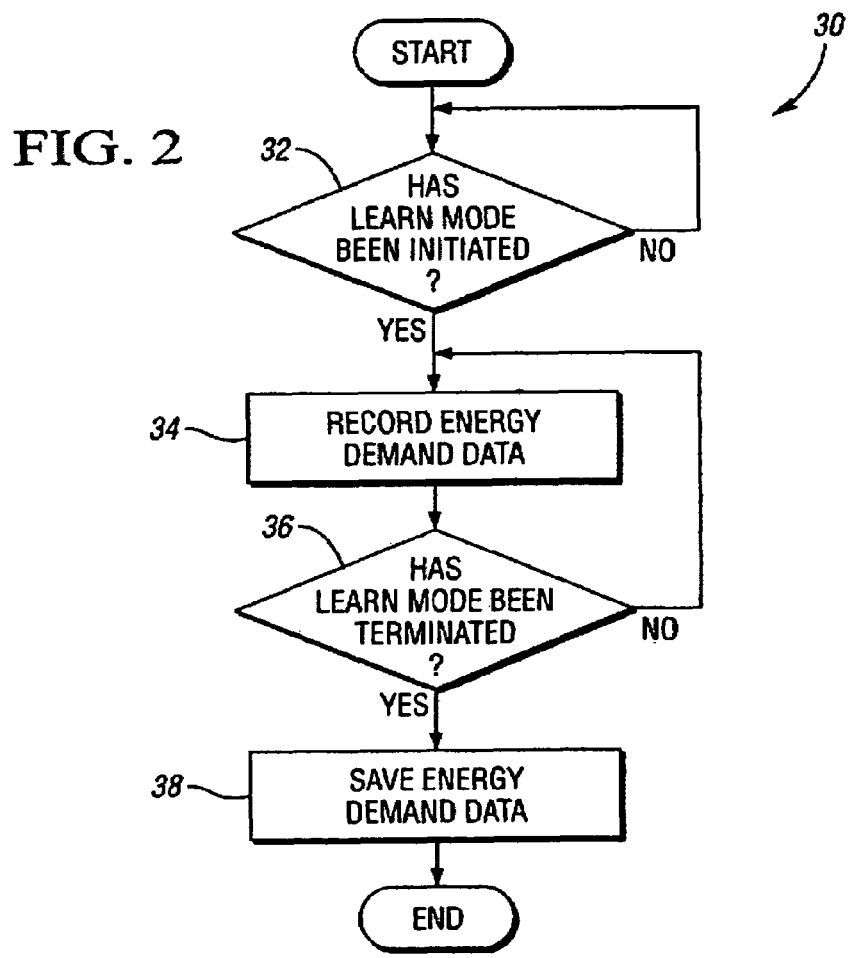
FIG. 2 is a flow chart illustrating a method for saving energy demand data of the hybrid vehicle of FIG. 1.

A method for saving energy demand data is shown in FIG. 2. More precisely, FIG. 2 shows an algorithm 30 that includes a series of block diagrams representing steps performed by the control module 12.

At step 32, the algorithm 30 determines whether learn mode has been initiated. More precisely, at step 32, the algorithm 30 determines whether the control module 12 (shown in FIG. 1) has received a signal from the selector 20 (shown in FIG. 1) initiating the learn mode. If the learn mode has not been initiated, the algorithm 30 repeats step 32. If the learn mode has been initiated, the algorithm 30 proceeds to step 34. At step 34, the algorithm 30 begins recording the energy demands of the vehicle 10 (shown in FIG. 1). The energy demand data is preferably recorded in the memory device 24 of the control module 12. According to a preferred embodiment, the energy demand data is recorded in a temporary memory location such as in RAM 26, however, the energy demand data may alternatively be recorded in any conventional memory device.

At step 36, the algorithm 30 determines whether learn mode has been terminated. More precisely, at step 36, the algorithm 30 determines whether the control module 12 (shown in FIG. 1) has received a signal from the selector 20 (shown in FIG. 1) terminating the learn mode. If the learn mode has not been terminated, the algorithm 30 returns to step 34. If the learn mode has been terminated, the algorithm 30 proceeds to step 38. At step 38, the algorithm 30 saves the recorded energy demands of the vehicle 10 (shown in FIG. 1). The energy demand data is preferably saved in the memory device 24 of the control module 12. According to a preferred embodiment, the energy demand data is saved in a non-volatile memory location such as in ROM 28, however, the energy demand data may alternatively be saved in any conventional memory device. For purposes of the present invention, a "non-volatile" memory location is a memory location that does not require power to retain saved data such that the saved data remains secure after the vehicle 10 is turned off.

It will be appreciated by one skilled in the art that the energy demand data recorded during a particular driving schedule may be implemented in a variety of different ways to improve the fuel efficiency of a hybrid vehicle during subsequent trips along a substantially similar driving schedule. For purposes of the present invention, a "driving schedule" is defined as a specific route having predefined starting and ending points such as, for example, a driving schedule defined along a specific route between an operator's home and office. As an example, advanced knowledge of a vehicle's energy demands would allow maximum implementation of the electric motor/generator 18 by operating the engine 14 only during periods of peak energy demand and simultaneously charging the battery 16 during such periods.

A method for implementing saved energy demand data to improve fuel economy in a hybrid vehicle according to the present invention is shown in FIG. 3. More precisely, FIG. 3 shows an algorithm 40 that includes a series of block diagrams representing steps performed by the control module 12. It should be appreciated that FIG. 3 represents one method for implementing saved energy data to improve fuel economy in a hybrid vehicle, however, alternate methods for improving fuel economy may also be envisioned as will be appreciated by one skilled in the art.

At step 42, the algorithm 40 determines whether the recall mode has been initiated. More precisely, at step 42, the algorithm 40 determines whether the control module 12 (shown in FIG. 1) has received a signal from the selector 20 (shown in FIG. 1) initiating the recall mode. If the recall mode has not been initiated, the algorithm 40 repeats step 42. If the recall mode has been initiated, the algorithm 40 proceeds to step 44. At step 44, the control module 12 determines whether the battery 16 (shown in FIG. 1) is charged less than a predetermined amount. According to a preferred embodiment, the control module 12 determines whether the battery 16 is less that 15% charged at step 44, however, the "predetermined amount" of step 44 may vary according to alternate embodiments. If the battery 16 is not charged less than a predetermined amount, the algorithm 40 proceeds to step 46. If the battery 16 is charged less than a predetermined amount, the algorithm 40 proceeds to step 48. At step 46, having established that the battery 16 is adequately charged, the algorithm 40 runs the electric motor/generator 18 (shown in FIG. 1) to power the hybrid vehicle 10 (shown in FIG. 1) of the present invention.

At step 48, the algorithm 40 determines whether the energy demands of the vehicle 10 (shown in FIG. 1) will exceed a predetermined limit within a predetermined amount of time. More precisely, at step 48, the microprocessor 22 (shown in FIG. 1) reviews the energy demand data saved in the memory device 24 to see if the energy demands of the vehicle 10 will exceed a predetermined limit within a predetermined amount of time. The predetermined energy demand limit may, for example, be that which exceeds the capacity of the electric motor/generator 18 and therefore requires operation of the engine 14. Both the predetermined energy demand limit and the predetermined amount of time may vary as required to meet the needs of a particular application. If the energy demands of the vehicle 10 will exceed a predetermined limit within a predetermined amount of time, the algorithm 40 proceeds to step 50. If the energy demands of the vehicle 10 will not exceed a predetermined limit within a predetermined amount of time, the algorithm 40 proceeds to step 52.

At step 50, the algorithm 40 checks to ensure the battery 16 (shown in FIG. 1) is sufficiently charged to power the vehicle 10 during the predetermined amount of time established at step 48. If the battery 16 is sufficiently charged, the algorithm 40 waits the predetermined amount of time at step 50 and proceeds to step 52. At step 52, the engine 14 is operated to power the vehicle 10 and to charge the battery 16. After step 52, the algorithm 40 returns to step 44.

A conventional hybrid vehicle would automatically run the engine to charge the battery at step 48 whenever the battery is less than a predetermined amount charged (e.g., less than 15%). Thereafter, the conventional hybrid vehicle would run the engine again to address any increased energy demands. This conventional mode of operation may unnecessarily run the engine to charge the battery when the battery would otherwise be completely charged during subsequent periods of increased energy demand. It can therefore be seen that by delaying the operation of the engine 14 until it is absolutely necessary, the engine 14 may be operated less frequently thereby improving the fuel efficiency of the hybrid vehicle 10.

While the best modes for carrying out the invention have been described in detail, those familiar with the art to which this invention relates will recognize various alternative designs and embodiments for practicing the invention within the scope of the appended claims.

The invention claimed is:

1. A method for improving fuel efficiency of a hybrid vehicle having an engine, a battery and an electric motor/generator, the method comprising:
   recording energy demand data of the hybrid vehicle during a first trip along a particular driving schedule; and
   utilizing the recorded energy demand data to minimize utilization of the engine and maximize utilization of the electric motor/generator during a subsequent trip along the driving schedule by determining whether a current energy demand exceeds the recorded energy demand during the subsequent trip along the driving schedule and waiting a predefined amount of time before activating the engine to charge the battery if the current energy demand is less than the recorded energy demand, such that the fuel efficiency of the hybrid vehicle is improved.

2. The method of claim 1, wherein said utilizing the energy demand data includes anticipating periods of increased energy demand.

3. The method of claim 1 further comprising determining whether an electrical charge on the battery is greater than a predefined charge threshold and activating the electric motor/generator to propel the vehicle if the electrical charge is greater than the a predefined charge threshold.

4. The method of claim 1, wherein said recording energy demand data includes storing the energy demand data at a temporary memory location.

5. The method of claim 1 further comprising saving the energy demand data to a non-volatile memory location.

6. The method of claim 1 further comprising determining whether a recall mode has been initiated prior to recalling the energy demand data.

7. A method for improving fuel efficiency of a hybrid vehicle having an engine, a battery and an electric motor/generator, the method comprising:

recording energy demand data of the hybrid vehicle during a first trip along a particular driving schedule;

recalling the energy demand data prior to a subsequent trip along the driving schedule;

evaluating the energy demand data to anticipate periods of increased energy demand that require operation of the engine; and coordinating the charging of the battery with the periods of increased energy demand to minimize implementation of the engine such that the fuel efficiency of the hybrid vehicle is improved by determining whether a current energy demand exceeds the recorded energy demand during the subsequent trip along the driving schedule and waiting a predefined amount of time before activating the engine to charge the battery if the current energy demand is less than the recorded energy demand.

8. The method of claim 7 further comprising determining whether a learn mode has been initiated prior to said recording energy demand data.

9. The method of claim 7, wherein said recording energy demand data includes storing the energy demand data at a temporary memory location.

10. The method of claim 7 further comprising saving the energy demand data to a non-volatile memory location.

11. The method of claim 7 further comprising determining whether a recall mode has been initiated prior to said recalling the energy demand data.

12. A method for improving fuel efficiency of a hybrid vehicle having an engine, a battery and an electric motor/generator, the method comprising:

determining whether a learn mode has been initiated;

recording energy demand data of the hybrid vehicle during a first trip along a particular driving schedule if said learn mode has been initiated;

determining whether a recall mode has been initiated;

recalling the energy demand data prior to a subsequent trip along the driving schedule if said recall mode has been initiated;

evaluating the energy demand data to anticipate periods of increased energy demand that require operation of the engine; and coordinating the charging of the battery with the periods of increased energy demand to minimize implementation of the engine such that the fuel efficiency of the hybrid vehicle is improved by determining whether a current energy demand exceeds the recorded energy demand during the subsequent trip along the driving schedule and waiting a predefined amount of time before activating the engine to charge the battery if the current energy demand is less than the recorded energy demand.

13. The method of claim 12, wherein said recording energy demand data includes storing the energy demand data at a temporary memory location.

14. The method of claim 12 further comprising saving the energy demand data to a non-volatile memory location.

* * * * *